US010320711B2

(12) United States Patent
Denteneer et al.

(10) Patent No.: US 10,320,711 B2
(45) Date of Patent: Jun. 11, 2019

(54) REAL-TIME WIRELESS MULTICAST ROUTER

(71) Applicant: SIGNIFY HOLDING B.V., Eindhoven (NL)

(72) Inventors: Theodorus Jacobus Johannes Denteneer, Eindhoven (NL); Petrus Desiderius Victor Van Der Stok, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 154 days.

(21) Appl. No.: 15/114,804

(22) PCT Filed: Jan. 20, 2015

(86) PCT No.: PCT/EP2015/050953
§ 371 (c)(1),
(2) Date: Jul. 27, 2016

(87) PCT Pub. No.: WO2015/113862
PCT Pub. Date: Aug. 6, 2015

(65) Prior Publication Data
US 2016/0344660 A1 Nov. 24, 2016

(30) Foreign Application Priority Data

Jan. 31, 2014 (EP) .................................. 14153380

(51) Int. Cl.
*H04L 12/931* (2013.01)
*H04L 12/733* (2013.01)
(Continued)

(52) U.S. Cl.
CPC ............ *H04L 49/201* (2013.01); *H04L 45/20* (2013.01); *H04L 47/286* (2013.01); *H04L 47/32* (2013.01);
(Continued)

(58) Field of Classification Search
None
See application file for complete search history.

(56) References Cited

U.S. PATENT DOCUMENTS

2004/0023651 A1* 2/2004 Gollnick ................ G08C 17/02
455/423
2009/0103501 A1* 4/2009 Farrag ................... H04W 74/02
370/337
(Continued)

FOREIGN PATENT DOCUMENTS

CN 1716910 A 1/2006

OTHER PUBLICATIONS

Eric Rozner et al, "ER: Efficient Retransmission Scheme for Wireless LANs", Univ. of Texas at Austin.
(Continued)

*Primary Examiner* — Kodzovi Acolatse
*Assistant Examiner* — Manuel Rangel

(57) ABSTRACT

This invention generally relates to Low-power and Lossy Wireless Networks. The proposed solution takes advantage of the fact that retry mechanism and back-off mechanism are already present in trickle-based algorithms. This way, it is possible to disable the equivalent features present at the MAC level which are the main causes of the large maxima of the fluctuating end-to-end delay. Also, it has been done away with the additional waiting time which comes from the packet waiting in the buffer in the MAC. Therefore, it has been provided a real-time layer with a limited size buffer able to allocate a deadline to a multicast packet and to select packets for transmission or rejection on the basis of the packet deadline. This way, it is kept a tighter hold on the rejection and waiting of the packets.

15 Claims, 2 Drawing Sheets

(51) Int. Cl.
*H04L 12/841* (2013.01)
*H04L 12/875* (2013.01)
*H04L 12/823* (2013.01)
*H04L 29/12* (2006.01)
*H04L 29/06* (2006.01)
*H04W 4/80* (2018.01)
*H04W 84/12* (2009.01)

(52) U.S. Cl.
CPC ........ *H04L 47/564* (2013.01); *H04L 61/6022* (2013.01); *H04L 65/608* (2013.01); *H04W 4/80* (2018.02); *H04W 84/12* (2013.01); *Y02D 70/00* (2018.01); *Y02D 70/142* (2018.01); *Y02D 70/144* (2018.01)

(56) References Cited

U.S. PATENT DOCUMENTS

| | | | | |
|---|---|---|---|---|
| 2011/0032941 | A1* | 2/2011 | Quach | H04L 47/10 370/392 |
| 2011/0280240 | A1* | 11/2011 | Yamagaki | H04L 1/1883 370/389 |
| 2012/0039235 | A1* | 2/2012 | Chen | H04L 12/189 370/312 |
| 2012/0170591 | A1* | 7/2012 | Diab | H04L 12/40032 370/417 |
| 2012/0236857 | A1* | 9/2012 | Manzella | H04L 49/109 370/390 |
| 2013/0034076 | A1* | 2/2013 | Ketchum | H04W 72/12 370/329 |
| 2014/0003429 | A1* | 1/2014 | Fernandez Gutierrez | H04L 12/185 370/390 |
| 2014/0113600 | A1* | 4/2014 | El Gamal | H04W 28/16 455/414.3 |
| 2014/0140342 | A1* | 5/2014 | Narad | H04L 45/16 370/389 |
| 2014/0146677 | A1* | 5/2014 | Howes | H04L 47/22 370/235 |

OTHER PUBLICATIONS

Sumathi Gopal et al, "Experimental Evaluation of the TCP Simultaneous—SendProblem in 802.11 Wireless Local Area Networks", SIGCOMM'05 Workshops, Aug. 22-26, pp. 23-28.

Isam Ishag et al, "IETF Standardization in the Field of the Internet of Things (IoT): A Survey", Journal of Sensor and Actuator Networks, 2013, 2, 235-287, doi:10.3390/jsan2020235.

T. Winter et al, "IPv6 Routing Protocol for Lower-Power and Lossy Networks", Internet Engineering Task Force, pp. 1-157, Standards Track, ISSN: 2070-1721.

Nakjung Choi et al, "Leader-Based Multicast Services in IEEE 802.11v Networks", IEEE Communications Society, IEEE CCNC 2010 proceedings, pp. 1-5.

IEEE Standards Association, IEEE, Part 15.4: Low-Rate Wireless Personal Area Networks (LR-WPANs), IEEE STD 802.15.4-2011 (Revision of IEEE STD 802.15.4-2006), Sep. 5, 2011, pp. 1-313.

P. Van Der Stok, Multicast Requirements for Control Over LLN Draft-Vanderstok-Roll-MCREQ-00, Feb. 24, 2012, Philips Research, pp. 1-10.

Marc Aoun et al, "Packet Skipping and Network Coding for Delay-Sensitive Network Communication", Philips Research, Eindhoven, Netherlands, pp. 1-30, May 17, 2012.

IEEE Standard for Information Technology—Telecommunications and Information Exchange Between Systems—Local and Metropolitan Area Networks—Specific Requirements, Wireless MAC and PHY Specifications for LR-WPANS, IEEE , Std 802|15|4-2006, Part 15.4: Wireless Medium Access Control (MAC) and Physical Layer (PHY) Specifications for Low-Rate Wireless Personal Area Networks (WPANs), pp. 1-25.

Peter Van Der Stok, "Real-Time Multicast for Wireless Mesh Networks Using MPL", MPL Simulation, May 10, 2014, pp. 1-38.

* cited by examiner

REAL-TIME WIRELESS MULTICAST ROUTER

CROSS-REFERENCE TO PRIOR APPLICATIONS

This application is the U.S. National Phase application under 35 U.S.C. § 371 of International Application No. PCT/EP2015/050953, filed on Jan. 20, 2015, which claims the benefit of European Patent Application No. 14153380.2, filed on Jan. 31, 2014. These applications are hereby incorporated by reference herein.

FIELD OF THE INVENTION

The present invention relates to Low-power and Lossy Wireless Networks LLWNs). More particularly, the present invention relates to a router and a method for controlling multicast transmission in a LLWN.

BACKGROUND OF THE INVENTION

In recent years, Low-power and Lossy Wireless Networks (LLWNs) have become a very important and challenging topic. LLWNs consist of spatially distributed autonomous devices which have limited energy, memory and processing resources. Applications for such networks may range, for instance, from environment monitoring (e.g. wireless sensor networks), to consumer electronics applications (e.g. remote control systems), to health monitoring (e.g. wireless devices worn on one's person for monitoring vital signs such as heart rates), to lighting control (e.g. for intelligent building management).

In many applications over LLWNs, it is required to control several nodes at the same time. For instance, lighting networks have the specific requirement that many lights need to be switched on, off or dimmed almost simultaneously. In LLWNs where packet technologies are used, such as Internet Protocol (IP), multicast transmission is the proper choice for such applications. Indeed, with multicast, information is communicated from a single source to a group of destinations (e.g., one or more nodes).

However, it has been found that such combination (e.g. IP+Multicast) over LLWNs appears to suffer from high end-to-end delays when the load of the traffic increases. Hence, high delays may be perceived by an end user from the moment where a control command is triggered till the moment where the command is actually executed at desired location within the network. This is problematic and it would be preferable to have the possibility to minimise end-to-end delays in LLWNs when network traffic load increases.

SUMMARY OF THE INVENTION

The present subject application provides a router and a method for controlling multicast transmission in a Low-power and Lossy Wireless Network (LLWN) as described in the accompanying claims. Specific embodiments of the subject application are set forth in the dependent claims.

Certain embodiments of the subject application include a router for controlling multicast transmission in a low-power wireless network. The proposed router comprises a trickle-based multicast protocol layer interface (MPL) adapted to create a multicast packet and a Medium Access Control layer interface (MAC) comprising a MAC layer queue adapted to receive a plurality of multicast packets. The MAC layer interface is adapted to transmit, over the network, the multicast packets stored in the MAC layer queue in their order of arrival. The MAC layer interface further comprises a MAC retry mechanism associated with a backoff mechanism and adapted to retransmit unsuccessfully transmitted multicast packets. The router is characterised in that it comprises a real-time layer interface (RTL) coupled to the MPL layer interface and the MAC layer interface, and adapted to disable the MAC layer queue, the MAC retry mechanism and the MAC backoff mechanism. The RTL interface is further adapted to receive the multicast packet from the MPL layer interface. RTL interface is also adapted to discard or alter the multicast packet by adding a deadline by which the altered multicast packet is to be discarded by a router of the network. Further, the RTL interface is adapted to forward the altered multicast packet to the MAC layer interface when the latter is ready to transmit and to put the altered multicast packet on hold when the MAC layer is not ready to transmit. Namely, RTL interface is adapted to forward, put on hold or discard the altered multicast packet based on the deadline.

In certain embodiments of the subject application, it is included a method of controlling multicast transmission in a low-power wireless network. The method comprises:
  providing a trickle-based multicast protocol layer, MPL, interface adapted to create a multicast packet; and,
  providing a Medium Access Control, MAC, layer interface comprising a MAC layer queue adapted to receive a plurality of multicast packets, the MAC layer interface being adapted to transmit, over the network, the multicast packets stored in the MAC layer queue in their order of arrival, the MAC layer interface further comprising a MAC retry mechanism associated with a backoff mechanism and adapted to retransmit unsuccessfully transmitted multicast packets. The method is characterised in that it further comprises:
  disabling the MAC layer queue, the MAC retry mechanism and the MAC backoff mechanism;
  receiving the multicast packet from the MPL layer interface;
  altering the multicast packet by adding a deadline by which the altered multicast packet is to be discarded by a router of the network, the deadline being based on the time of reception of the multicast packet;
  forwarding the altered multicast packet to the MAC layer interface when the latter is ready to transmit; and,
  putting the altered multicast packet on hold when the MAC layer is not ready to transmit. Namely, forwarding, putting on hold or discarding the altered multicast packet is based on the deadline.

Certain embodiments of the subject application also include a non-transitory computer readable medium having stored thereon instructions for causing one or more processing units to execute the method of the subject application.

These and other aspects of the subject application will be apparent from, and elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the subject application may for the most part, be composed of mechanisms, electronic components and circuits known to those skilled in the art, details will not be explained in any greater extent than that considered necessary for the understanding and appreciation of the underlying concepts of the subject application, in order not to obfuscate or distract from the teachings of the subject application.

Figure 1:
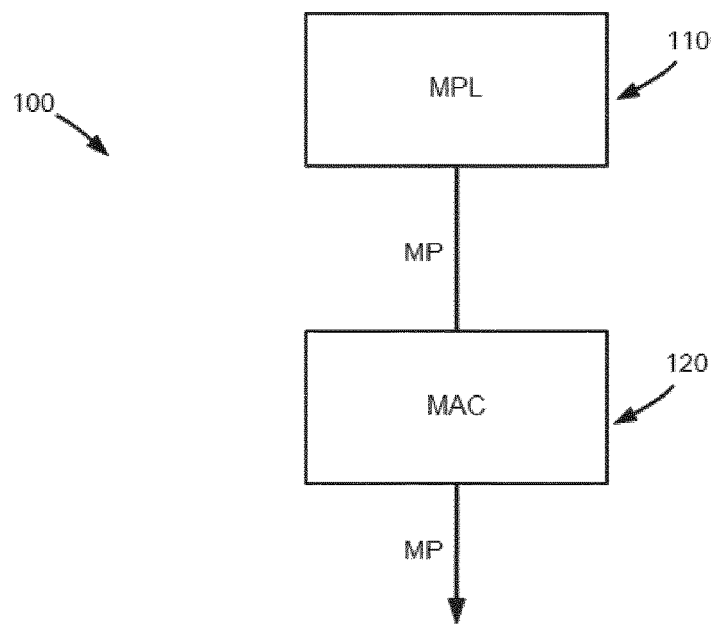
FIG. 1 is a schematic diagram of a prior art router.

Referring to FIG. 1, there is diagrammatically shown therein a prior art router 100. The router 100 as shown comprises:
 a trickle-based multicast protocol layer interface (MPL) 110; and,
 a Medium Access Control layer interface (MAC) 120 operably coupled to the MPL 110.

MPL 110 is adapted to distribute packets to all destinations by resending received packet to all neighbours and MAC 120 is adapted to handle point to point transmission of packets between two nodes.

As shown therein, the MPL 110 may be based on a protocol such as the Multicast Protocol for Low power and Lossy Networks which has been recently standardised by the Internet Engineering Task Force (IETF). Hereinafter, the Multicast Protocol for Low power and Lossy Networks will be considered for illustration. However, of course, other multicast protocol layer interfaces based on the trickle algorithm may be contemplated as well. In FIG. 1, MPL 110 is configured to receive multicast packets (MP) with a multicast address. For example, a MP with a multicast address may have been sent to the MPL 110 by an Internet Protocol (IP) layer interface situated on top of MPL 110. For instance the IP layer interface may be the 6LoWPAN which is an IPv6 layer for Low Power Wireless Personal Areal Networks. Later, at the reception of a MP, MPL 110 starts a series of consecutive intervals where the first interval has a minimum value of $I_{min}$. Each consecutive interval is twice as long as the former with a maximum value of $I_{max}$. There is a maximum of intervals given by max_expiration parameter. For each interval of length I, a time t is randomly chosen in the period [I/2; I]. For a given MP during an interval of length I, MPL 110 counts the number of times it receives MP during the period [0; t] and store it in a counter c. Then, at time t, MPL 110 re-broadcasts MP when c is less than k, wherein k is a predefined value greater than 0. To summarise, MPL 110 is able to retransmit a MP a certain number of times based on a kind of back-off mechanism.

Referring back to FIG. 1, MAC 120 may be any medium access controller layer used in Low-power and Lossy Wireless Networks (LLWNs) such as IEEE 802.15.4, Bluetooth or Low Power Wi-Fi. However, in the following description only IEEE 802.15.4 will be considered as an example. It will also be considered the unslotted MAC 120 in the rest of the description. However, with minor adjustments it is clearly envisaged that slotted MAC 120 may be contemplated as well. With unslotted MAC 120 and before transmission over the wireless medium, a MP can be stored in a memory local to the MAC such as MAC layer queue. In the MAC layer queue, MPs are served consecutively on a first come first served basis. Hence, when the MAC layer queue is full, new MPs (i.e. new incoming MPs) are rejected (i.e. discarded) by the MAC 120. The first MP to be served is called the read-to-send packet (RTS). MPs are transmitted over the wireless medium following the Carrier Sense Multiple Access/Collision Avoidance (CSMA/CA) algorithm. Namely, before sending the RTS, a delay is introduced with a random value in the back-off interval $[0; 2^{BE}-1]$ wherein BE has a value between 1 and 5. After the delay has elapsed, the MAC 120 senses if the wireless medium is free. Then when the medium is free, MP is sent onto it. However, when the medium is occupied, again the random delay is recalculated but this time with an increased BE value up till a maximum value, followed by the sensing of the wireless medium. This operation is repeated a certain number of times (e.g. according to the macMaxCSMABackoff parameter). When after the numerous retries, MP could not be sent, the MAC 120 rejects MP. To summarise, MAC 120 comprises a MAC layer queue adapted to receive a plurality of MPs wherein MPs stored in the MAC layer queue are transmitted based on their order of arrival in the queue. MAC 120 further comprises a retry mechanism associated with a MAC back-off mechanism and adapted to retransmit unsuccessfully transmitted MPs.

With regard the prior router 100 of FIG. 1, it has been found that the combination of IP, MPL 110 and MAC 120 over LLWNs appears to suffer from high end-to-end delays when the load of the traffic increases. For instance, it has been found in a lighting network that the maximum delay between sending a command to a group of lights with MPL till its arrival in all specified lights can take a lot of time such that the feeling of simultaneity is not perceived by an end user from the moment where a control command is triggered till the moment where the command is actually executed at desired lights within the network. This is problematic and it would be preferable to have the possibility to minimise end-to-end delays in LLWNs when network traffic load increases. For the sake of simplicity, hereinafter, where necessary, reference will be mainly made to lighting networks, although other types of networks as exemplary listed above have similar drawbacks to those that have been articulated above in relation to lighting networks.

Although LLWNs use a wireless medium which poses several challenges such as its unreliability coming from e.g. multipath fading and interferences by other RF generators, it has been found that poor performance in terms of end-to-end delays in lighting networks is mainly due to the MAC 120 being too slow. Namely, it has been identified that the slowness of the MAC 120 is mainly due to the use of the MAC layer queue, the MAC retry mechanism and the MAC back-off mechanism. Indeed, when MPL 110 needs to send a MP, it has to request the MAC 120 to have the MP sent of the wireless medium. However, when the MAC 120 is not free to operate, because for instance the wireless medium is busy, several MPs may be standing out in the MAC 120 and waiting for at least the RTS packet to be sent. However, the sending out of the RTS can take a lot of time and the others MPs in the MAC queue solely have to wait for their turn. This also means that if one has a MP that has to be sent very quickly to switch on a group of lights, then such MP will have to wait for all other preceding MPs to be sent first. Hence, there is no established importance management of the MPs at the MAC 120. Also, the order of offering packets to the MAC 120 and the choice of throwing away packets under buffer overflow are completely random and determined solely by the order of which packets (or their copies) arrive. Further, the sojourn times of packets in the MAC 120 depends on the order in which packet are offered to the MAC 120. Therefore, it is proposed to change the way MPs are transmitted over the wireless medium via the MAC 120. Namely in the subject application, it is proposed to disable from the MAC 120 the MAC layer queue, the MAC retry mechanism and the MAC back-off mechanism and to implement an improved queue mechanism. The foregoing proposition comes from the fact that, as it has been showed above, the MPL 110 already comprises a retry mechanism and a back-off mechanism. Therefore, it does not seem necessary to keep the ones located at the MAC 120 level. Indeed, every time a MP is received at the router 100, MP is re-broadcasted at least one, two or three times to all nodes of the multicast network.

Figure 2:
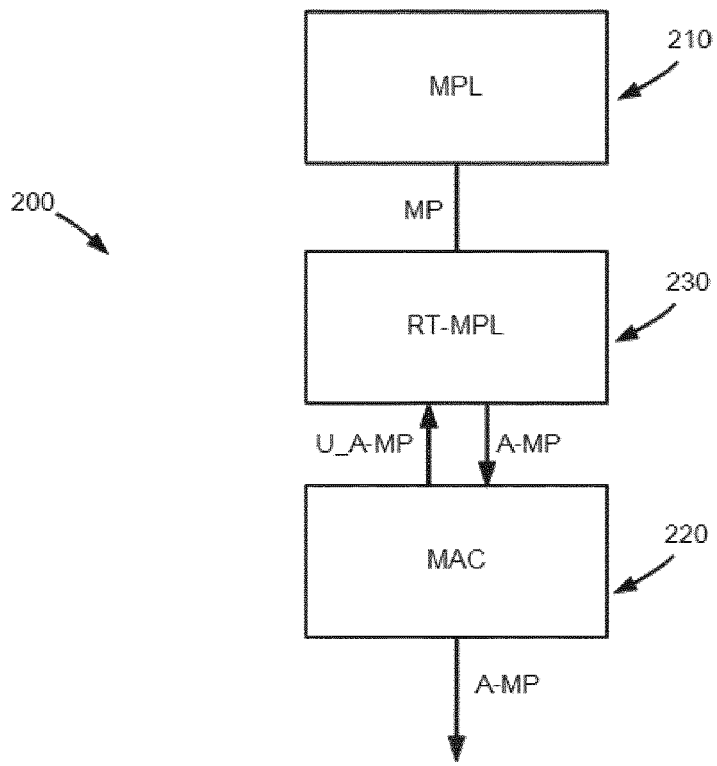
FIG. 2 is a schematic block diagram of a router in accordance with the subject application.

Referring now to FIG. 2, there is diagrammatically shown therein a router 200 for controlling multicast transmission in a low-power wireless network (LLWN) such as a lighting network. The router 200 as shown comprises:
 a trickle-based multicast protocol layer interface (MPL) 210 similar to MPL 110;
 a Medium Access Control layer interface (MAC) 220 similar to MAC 120; and,
 a real-time layer interface (RTL) 230 operably coupled to the MPL 110 and the MAC 220.

In FIG. 2, RTL 230 is adapted to disable the MAC layer queue, the MAC retry mechanism and the MAC backoff mechanism. For instance, this could be performed by setting certain parameters of the CSMA/CA algorithm to 0. These settings may be defined at the start-up of the router 200. In another example, these settings may be defined only when a given traffic load of the lighting network is experienced. Indeed, as explained earlier, drawbacks of the prior art router 100 mainly occur while traffic load is important.

In the example of FIG. 2, RTL 230 is further adapted to receive a multicast packet MP from MPL 210. Once the MP is received, RTL 230 is further adapted to alter the MP by adding a deadline thus creating an altered multicast packet A-MP. The deadline is a parameter by which the A-MP is to be discarded by a router 200 of the network. The foregoing feature means that when an A-MP is being received from another router 200, the latter will analyse its deadline, if it has one, and decide to reject it if its deadline has already passed. The deadline may also be understood as being the time by which the A-MP has to arrive at a destination in the lighting network.

For example, in lighting networks wherein light nodes have synchronised clock, the deadline may be equal to the sum of the time of generation of the MP at its source router 200 and a given propagation time. The source router 200 should be understood as being the router 200 which created the MP and sent it on the lighting network. In the exemplary Multicast Protocol for Low power and Lossy Networks such router is called the seed router 200. Hence, the time of generation of the MP is the time at which the source router 200 created the MP. Regarding the given propagation time, it may be dependent on the type of application to be used on the network. For instance, in lighting networks a given propagation time comprised between 150 ms and 250 ms, such as 200 ms has been found to give the impression of simultaneity. Hence in an example, the deadline may be defined as follows: time of generation +200 ms. Therefore, if the time of generation is for instance 1 PM and that the A-MP is received at a node at the time 1 PM and 300 ms, then A-MP would have arrived too late and would be discarded. In this embodiment, the A-MP may comprise the pre-calculated deadline or the time of generation. In the latter case, it would be then assumed that the given propagation time is known is advanced in light nodes of the network. For instance, this could be a constant value.

In another example, wherein light nodes do not have synchronised clock, the deadline may be based on an actual clock time of the router 200 receiving the A-MP packet and a number of hops travelled by the A-MP from its source router 200 to the receiving router 200. In this embodiment, the A-MP may piggy-back the number of hops already travelled. This means, that a router 200 while receiving an A-MP is also adapted to alter the A-MP in order to update the number of hops already travelled. In an example, if it is assumed that a given propagation time and a given hop time are known by nodes of the network, the deadline may be defined as follows: (actual clock time+given propagation time)−(given hop time*number of hops already travelled). For instance, in lighting networks it has been found that a hop time comprised between 15 ms and 25 ms, such as 20 ms can be considered as being quite representative of the average hop time between two light nodes. Therefore, if the actual clock time is for instance 1 PM and that the A-MP has travelled over five nodes and that the hop time is 20 ms then if A-MP is received at a light node at the time 1 PM and 150 ms, then A-MP would have arrived too late and would be discarded.

In the example of FIG. 2, once A-MP has been created, RTL 230 is adapted to forward A-MP to MAC 220 or put A-MP on hold. It is then to be understood that RTL 230 forwards or puts on hold an A-MP based on its deadline. In order to exemplify these mechanisms, FIG. 3 will be described with reference to FIG. 2.

Figure 3:
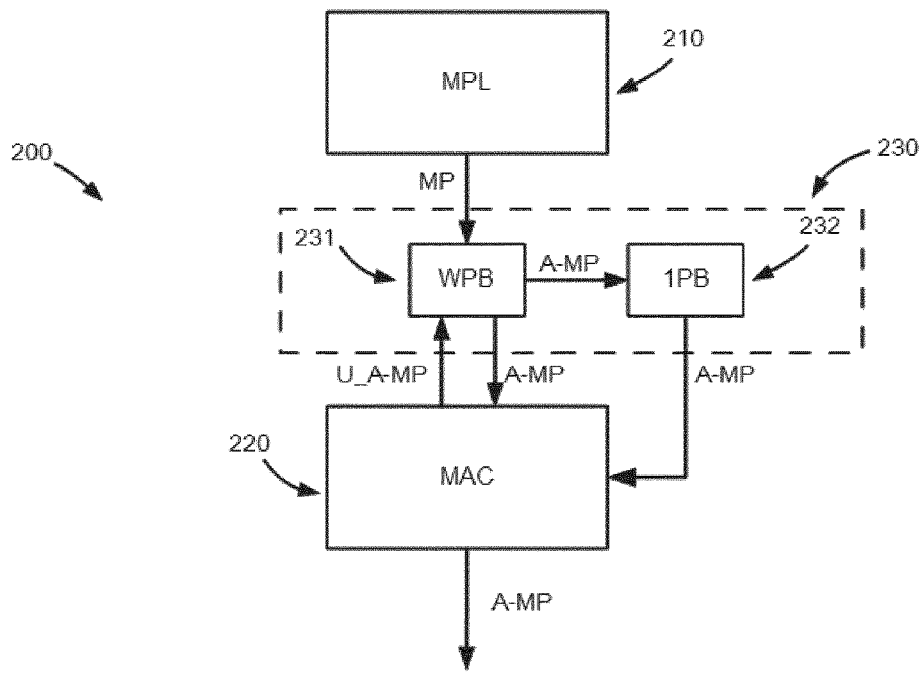
FIG. 3 is a schematic block diagram of an embodiment of the router of FIG. 2.

FIG. 3 is a schematic block diagram of an embodiment of the router 200 of FIG. 2. In the example of FIG. 3, RTL 230 comprises a working buffer WPB 231 and a one-place buffer 1PB 232. WPB and 1PB both only have a single memory location, i.e. only one packet may be stored therein at a time. However in other embodiments and without departing from teachings of the subject application, more than one memory locations may be comprised in each of the buffer, depending on the type of application to be used.

In the example of FIG. 3, RTL 230 is adapted to receive a MP from MPL 210, to create the A-MP as already described above and to store it into the WPB. Then, if the MAC 220 is free to operate and the 1PB is empty, RTL 230 is further adapted to forward the A-MP from the WPB to the MAC 220 for transmission on the wireless medium. It is to be understood that MAC 220 is free to operate when it is not transmitting any packet. Conversely, the MAC 220 is not free to operate as soon as it receives a packet for transmission. If the MAC 220 is not free to operate and that the WPB is filled and 1PB is empty, then RTL 230 is further adapted to put the A-MP of WPB on hold for instance by storing it into the 1PB. However, if the MAC 220 is not free to operate and that both the WPB and 1PB are filled, then RTL 230 is further adapted to discard the A-MP of either WPB or 1PB which has the shortest deadline. Namely, in the proposed solution of the subject application, it is proposed to reject the oldest A-MP being put on hold due to unavailability of the wireless medium and unable to satisfy its timeliness requirements. For example, if the content of WPB is discarded then nothing special need to be done apart from waiting for the availability of the wireless medium. In contrast, where the MAC 220 is not free to operate and that the content of 1PB is emptied then RTL 230 is further adapted to move the content of WPB into 1PB.

In another example of FIG. 3, RTL 230 is adapted to receive an unsuccessfully transmitted altered multicast packet U_A-MP from the MAC 220, because the wireless medium was occupied by another router 200. For instance, U_A-MP may be stored on the WPB. Hence there may be several situations to consider. For instance, the 1PB is empty while the WPB comprises the U_A-MP, then U_A-MP may be stored on 1PB. In another embodiment, U_A-MP may be directly submitted to the MAC 220. However, where the WPB comprises the U_A-MP and the 1PB is filled with A-MP, then at least two scenarios may contemplated. In a first embodiment, if the U_A-MP is having a deadline which is greater than the deadline of the stored A-MP, then the A-MP is discarded and the U_A-MP is moved from the WPB to the 1PB. Also, another option may consist in sending directly the U_A-MP to the MAC 220 once it is received by the WPB. In another embodiment, if the U_A-MP is having a deadline which is lesser than the deadline of the stored A-MP, then the U_A-MP is discarded and the A-MP waits for the MAC 220 to be free to operate. Also, another option may consist in sending directly the A-MP to the MAC 220 once the content of WPB has been discarded. In another example, where both the WPB and the 1PB contain A-MP and/or U_A-MP each originating from a specific source router 200 it may be possible to keep the appropriate packet and discard the other one based on a given priority associated with each source router 200. For instance, the priority associated with a source router 200 may be incorporated in the payload of the A-MP and/or U_A-MP. For example, the priority may be implemented as a sequence number. Therefore, the A-MP and/or U_A-MP associated with the highest priority may be selected where both A-MP and/or U_A-MP are filled in WPB or 1PB by comparing their respective sequence number. Another option may consist in keeping only the A-MP and/or U_A-MP having the largest hop count. Also, it may be possible to use other scheduling strategies such as those published in the literature (e.g. T. He, J. A. Stankovic C. Lu, t. Abdelzaher, "SPEED: a stateless protocol for real-time communication in sensor networks", ICDCS-23, 2003).

Figure 4:
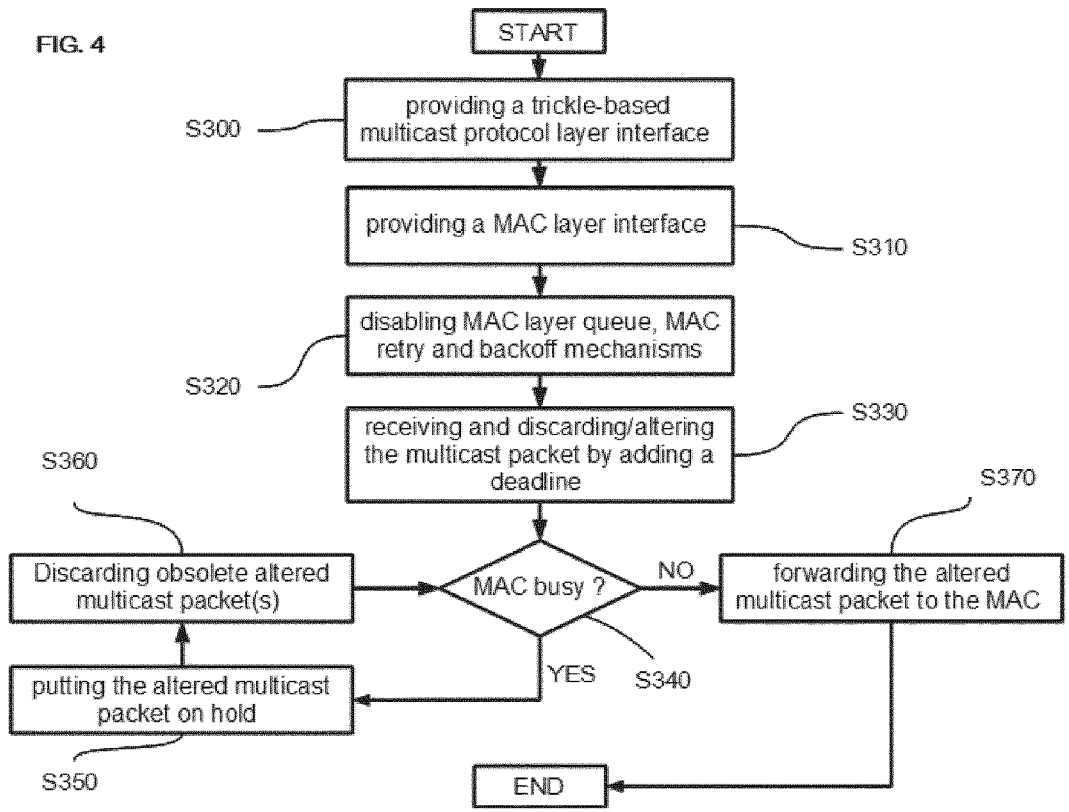
FIG. 4 is a schematic flow diagram of a method according to an embodiment of the subject application.

Referring now to FIG. 4, there is diagrammatically shown therein a flow diagram of a method according to an embodiment of the subject application and with regard to the router 230 of FIG. 2.

In S300, as already explained above, it is provided the MPL 210 such as the Multicast Protocol for Low power and Lossy Networks standardised by the IETF.

In S310, as already explained above, it is provided the MAC 220 such as the IEEE 802.15.4, Bluetooth or Low Power Wi-Fi.

Then S320, as already explained above, it is disabled the MAC layer queue, the MAC retry mechanism and the MAC back-off mechanism of the MAC 220.

Later in S330, it is received and discarded/altered the MP by adding a deadline, as already explained above.

In S340, it is determined whether the MAC is free to operate.

In S350, the MAC is busy and it is put on hold the A-MP. Also, in S360, it is discarded obsolete A-MPs based on the deadline, as already explained above.

In S370, the MAC is free to operate and it is forwarded the A-MP to the MAC.

The skilled person would appreciate that the proposed solution takes advantage of the fact that retry mechanism and back-off mechanism are already present in trickle-based algorithms. This way, it is possible to disable the equivalent features present at the MAC level which are the main causes of the large maxima of the fluctuating end-to-end delay. Also, it has been done away with the additional waiting time which comes from the packet waiting in the buffer in the MAC. Indeed, packets are stored in the MAC in a first come first served fashion. Hence, once a packet is stored in the MAC queue, the packet cannot be removed and is necessarily rejected or sent after the treatment of all earlier packets in the MAC queue. Therefore, it has been provided a real-time layer with a limited size buffer able to allocate a deadline to a multicast packet and to select packets for transmission or rejection on the basis of the packet deadline. This way, it is kept a tighter hold on the rejection and waiting of the packets. Indeed, the MAC queue is set to zero (i.e. no waiting packets in the MAC) and one or zero packets are in the process of transmission by the MAC. A buffer area has been created under the control of the real time layer in which n packets are stored. In the foregoing description a buffer of two packets has been considered. However, other sizes of the buffer may be contemplated without departing from the teachings of the subject application. In a lighting network, it has been found the proposed real time layer interface has the effect that maximum communication times are halved and losses due to overload are considerably reduced.

Of course, the above advantages are exemplary, and these or other advantages may be achieved by the proposed solution. Further, the skilled person will appreciate that not all advantages stated above are necessarily achieved by embodiments described herein.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

However, other modifications, variations and alternatives are also possible. The specifications and drawings are, accordingly, to be regarded in an illustrative rather than in a restrictive sense. For instance the real-time layer interface may be directly integrated within the MPL layer interface (e.g. in the network layer) or within the MAC layer interface. Regarding the router, it is to be understood that it may act as a source router able to generate a multicast packet and also as a receiving router able to forward a received multicast packet.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The subject application scope is defined in the following claims and the equivalents thereto. Furthermore, reference signs used in the description and claims do not limit the scope of the subject application as claimed.

The principles of various embodiments of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. A router for controlling multicast transmission in a low-power wireless network, the router comprising:
   a trickle-based multicast protocol layer, MPL, interface adapted to create a multicast packet; and,
   a Medium Access Control, MAC, layer interface comprising a MAC layer queue adapted to receive a plurality of multicast packets, the MAC layer interface being adapted to transmit, over the network, the multicast packets stored in the MAC layer queue in their order of arrival, the MAC layer interface further comprising a MAC retry mechanism associated with a backoff mechanism and adapted to retransmit unsuccessfully transmitted multicast packets;
   a real-time layer, RTL, interface coupled to the MPL layer interface and the MAC layer interface, wherein the RTL interface disables the MAC layer queue, the MAC retry mechanism and the MAC backoff mechanism and receives the multicast packet from the MPL layer interface,
   alters the multicast packet by adding a deadline by which said altered ,multicast packet is to be discarded by a router of the network, and, discards said multicast packet where said deadline has already passed;
   wherein the RTL interface further forwards said altered multicast packet to the MAC layer interface when the latter is ready to transmit puts said altered multicast packet on hold when the MAC layer is not ready to transmit, and forwards or puts on hold said altered multicast packet based on said deadline.

2. The router of claim 1, wherein when the MAC layer interface is not ready to transmit and that at least two altered multicast packets are put on hold, the RTL interface is further adapted to discard at least the multicast packet having the shortest deadline.

3. The router of claim 1, wherein when the MAC layer interface has unsuccessfully transmitted a first altered multicast packet and that at least a second altered multicast packet originating from the MPL interface is put on hold, the RTL interface is further adapted to receive and put on hold the first altered multicast packet received from the MAC layer interface and to discard at least the multicast packet having the shortest deadline.

4. The router of claim 1, wherein the deadline is based on the time of generation of the multicast packet at its source router on the network.

5. The router of claim 1, wherein the deadline is based on an actual clock time of the router and a number of hops travelled by the altered multicast packet from its source router to the router.

6. The router of claim 1, wherein the low-power wireless network is a wireless lighting network.

7. The router of claim 1, wherein the MPL layer interface is the Multicast Protocol for Low power and Lossy Networks.

8. The router of claim 1, wherein the MAC layer interface is one the IEEE 802.15.4, Bluetooth or Low Power Wi-Fi.

9. Method of controlling multicast transmission in a low-power wireless network, the method comprising:
   providing a trickle-based multicast protocol layer, MPL, interface adapted to create a multicast packet; and,
   providing a Medium Access Control, MAC, layer interface comprising a MAC layer queue adapted to receive a plurality of multicast packets, the MAC layer interface being adapted to transmit, over the network, the multicast packets stored in the MAC layer queue in their order of arrival, the MAC layer interface further comprising a MAC retry mechanism associated with a backoff mechanism and adapted to retransmit unsuccessfully transmitted multicast packets;
   providing a real-time layer, RTL, interface coupled to the MPL layer interface and the MAC layer interface, wherein the RTL interface disables the MAC layer queue, the MAC retry mechanism and the MAC backoff mechanism; and receives the multicast packet from the MPL layer interface; and alters the multicast packet by adding a deadline by which said altered multicast packet is to be discarded by a router of the network; and discards said multicast packet where said deadline has already passed; and forwards said altered multicast packet to the MAC layer interface when the latter is ready to transmit; and puts said altered multicast packet on hold when the MAC layer is not ready to transmit; and forwards or puts on hold said altered multicast packet based on the deadline.

10. The method of claim 9, wherein when the MAC layer interface is not ready to transmit and that at least two altered multicast packets are put on hold, the method further comprises discarding at least the multicast packet having the shortest deadline.

11. The method of claim 9, wherein when the MAC layer interface has unsuccessfully transmitted a first altered multicast packet and that at least a second altered multicast packet originating from the MPL interface is put on hold, the method further comprises receiving and putting on hold the first altered multicast packet received from the MAC layer interface and discarding at least the multicast packet having the shortest deadline.

12. The method of claim 9, wherein the deadline is based on the time of generation of the multicast packet at its source router on the network.

13. The method of claim 9, wherein the deadline is based on an actual clock time of the router and a number of hops travelled by the altered multicast packet from its source router to the router.

14. The method of claim 9, wherein the MPL layer interface is the Multicast Protocol for Low power and Lossy Networks layer interface and the MAC layer interface is one the IEEE 802.15.4, Bluetooth or Low Power Wi-Fi.

15. A non-transitory computer readable medium having stored thereon instructions for causing one or more processing units to execute the method according to claim 9.

\* \* \* \* \*